United States Patent [19]
Lange

[11] 3,728,950
[45] Apr. 24, 1973

[54] SHUTTER AND FILM CONTROLS FOR CAMERAS

[75] Inventor: Karl-Heinz Lange, 4980 Bunde 18, Germany

[73] Assignee: Balda Werke, Balda Werke, Germany

[22] Filed: Aug. 9, 1971

[21] Appl. No.: 169,953

[30] Foreign Application Priority Data

Jan. 21, 1971 Germany.....................P 21 02 773.6

[52] U.S. Cl..............95/31 FM, 95/31 FL, 95/31 AC
[51] Int. Cl..........G03b 1/04, G03b 1/62, G03b 9/68
[58] Field of Search....................................95/31 FM

[56] References Cited

UNITED STATES PATENTS

| 3,580,152 | 5/1971 | Engelsman et al. | 95/31 FM |
|---|---|---|---|
| 3,603,236 | 9/1971 | Engelsman | 95/31 FM |
| 3,599,551 | 8/1971 | Lemme | 95/31 FM |
| 3,618,496 | 11/1971 | Irwin | 95/31 FM |
| 3,633,477 | 1/1972 | Hackenberg et al. | 95/31 FM |
| 3,585,915 | 6/1971 | Oki et al. | 95/31 FM |
| 3,605,595 | 9/1971 | Irwin | 95/31 FM |

*Primary Examiner*—Samuel S. Matthews
*Assistant Examiner*—Russell E. Adams, Jr.
*Attorney*—Alex Friedman et al.

[57] ABSTRACT

A camera having a structure for controlling the tripping of the shutter and the movement of the film. A film-engaging structure has a position for holding the film against movement as well as a retracted position displaced from the film. A shutter-tripping structure when moving from a cocked to a rest position engages the film-engaging structure to retract the latter away from the film, the shutter-tripping structure also tripping the camera shutter when released by manual operation from its cocked position for movement to its rest position. The shutter-tripping structure is displaced from its rest to its cocked position in connection with the transportation of the film, and this movement of the shutter-tripping structure releases the film-engaging structure for movement to its film holding position.

5 Claims, 5 Drawing Figures

3,728,950

SHUTTER AND FILM CONTROLS FOR CAMERAS

BACKGROUND OF THE INVENTION

The present invention relates to cameras.

In particular, the present invention relates to that type of camera which is provided with a strip of film having perforations such as one film perforation for each frame.

A film-engaging structure is provided for acting under the influence of a spring to extend into a film perforation so as to hold the film in a position to make an exposure. A swingable shutter-tripping lever is displaced during transportation of film to a cocked position in opposition to a spring which urges the shutter-tripping lever to its rest position with this lever tripping the camera shutter when travelling from its cocked to its rest position. The shutter-tripping lever when displaced to its cocked position releases the film-engaging structure for movement to engage the film and enter into a perforation thereof for holding the film in a proper position for the next exposure.

Cameras having structure of this latter type are already known. Such a structure is shown for example in U.S. Pat. No. 3,538,824. Thus, a spring-actuated shutter-tripping lever is known for carrying out a plurality of functions such as tripping the shutter and releasing as well as blocking the film-engaging structure.

There are known constructions of this general type utilizing plastic materials in the construction of the camera and tending to a large extent to use electronic shutters.

However, the above known type of structure has drawbacks. For example a relatively large release stroke is required, and moreover the film-engaging structure must be pulled out of a film perforation during the shutter-releasing operations. These requirements have resulted in an undesirable increase in the force acting on the shutter-tripping structure, and in many cases the structure not only has the disadvantage of requiring a long shutter-releasing stroke but also results in unavoidable camera vibration and lack of sharpness in the photographs.

An additional drawback of the known structure resides in the fact that the shutter-tripping lever must take the form of a two-armed lever requiring an undesirably large amount of space since the downwardly directed arm of this lever when released to trip the shutter must become situated behind a stationary projection in order to maintain the shutter-tripping lever in its cocked position until the instant when tripping of the shutter takes place. This requirement of a special stop structure coacting with the lower lever arm to hold the lever in its cocked position is essential because the upwardly directed arm of the shutter-tripping lever must cooperate with cams or pins of a rotary flash-cube actuating element or a gear of a film transporting transmission in order to be placed in its cocked position and of course this upwardly directed arm of the lever must be able to move away from these cams or pins when tripping the shutter.

SUMMARY OF THE INVENTION

It is accordingly a primary object of the present invention to provide camera structure of the above general type which will however avoid the above drawbacks.

In addition, it is an object of the present invention to provide a structure of the above general type which will simplify the operation in connection with the several functions referred to above.

Furthermore it is an object of the present invention to provide a structure which will produce the desired results with springs which exert only a relatively small force so that there will be no danger of introducing into the camera a lack of steadiness with the resulting lack of sharpness in the photographs.

Also, it is an object of the present invention to provide a camera with a structure of the above general type which enables the tripping of the shutter to be brought about with a release stroke which is as small as possible.

Also, it is an object of the present invention to provide a structure of the above general type which is exceedingly compact and requires only a small amount of space in the interior of the camera.

In accordance with the invention a shutter-tripping means when moving from its cocked position to its rest position coacts with a film-engaging means for retracting the latter from a film holding position away from the film to a retracted position. The shutter-tripping means and the film-engaging means are respectively acted upon by a pair of spring means which have with respect to each other a relationship which enables the spring acting on the shutter-tripping means to produce all of the force required not only for tripping the shutter but also for retracting the film-engaging means away from the film out of a perforation thereof. This is brought about by providing a pair of engaging surfaces on the shutter-tripping means and the film-engaging means with one of the surfaces being inclined to form a camming surface.

BRIEF DESCRIPTION OF DRAWINGS

The invention is illustrated by way of examining the accompanying drawing which form part of this application and in which.

DESCRIPTION OF PREFERRED EMBODIMENTS

Figure 1:
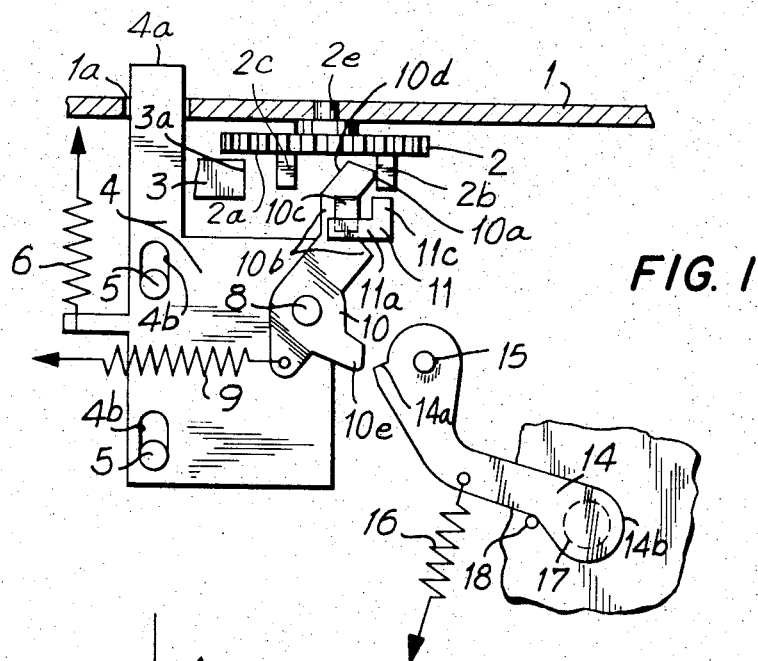
FIG. 1 is a schematic elevation of structure according to the invention, a top wall of the camera being shown in section in FIG. 1 and FIG. 1 showing the parts in their rest positions.

Referring to FIG. 1, there is illustrated in section therein the top wall 1 of the camera. This top wall 1 is formed with an opening which receives a pin 2e which is coaxially fixed to and forms part of a rotary member 2, so that the latter is supported for rotation by engagement of the pin 2e in the illustrated opening of the camera top wall 1. This rotary member 2 may form any one of a number of different camera components. For example it may form part of a transmission which is actuated in connection with transportation of the film. Thus, the camera will include a conventional lever actuated by the operator for transporting the film, and in response to turning of this lever a gear transmission will be actuated to bring about film transport as is well known. The rotary member 2 may form part of the structure which is actuated during transportation of the film. Also, it is possible for this rotary member 2 to form part of a flash-cube supporting structure which is turned for example through 90° simultaneously with the transportation of the film so that a previously ignited flash lamp may be turned away from an exposure position to be replaced by a flash lamp which will be ignited at the next exposure, as is well known. Thus, whenever the film is transported the rotary member 2 is turned by a predetermined angle.

The rotary member 2 fixedly carries at its lower surface $2a$ a plurality of elongated pins. There are at least four such pins, although preferably the rotary member 2 is provided with five such pins which act as cams in a manner described in greater detail below. For the purpose of simplicity of illustration, however, only three camming pins $2b$, $2c$ and $2d$ are illustrated. During successive exposures the pins or cams $2b$, $2c$ and $2d$ will successively engage, respectively, an edge $10a$ of a swingable shutter-tripping lever 10 which forms a shutter-tripping means, the coaction between each of the pins $2b$, $2c$, $2d$ and the shutter-tripping means 10 being described in greater detail below.

A spring means 9 is operatively connected with the shutter-tripping means 10 so as to urge the latter from a cocked position to a rest position, and during travel of the lever 10 in a clockwise direction, as viewed in FIGS. 1-4, around a pivot pin 8, the projection $10e$ of the lever 10 will trip the camera shutter. Thus, the pin 8 extends through an opening of the lever 10 to support the latter for swinging movement and the spring 9 acts on the lever 10 to urge the latter in a clockwise direction about the pin 8, as viewed in FIGS. 1-4. The projection $10e$ of the lever 10 will, during travel of the lever 10 from its cocked to its rest position, strike against an edge $14a$ of the shutter 14. The illustrated shutter 14 is in the form of a leaf or blade supported for swinging movement about a stationary pin 15 and urged to the shutter-closing position illustrated in FIGS. 1-4 by a spring 16. In its closed position the shutter 14 has its portion $14b$ extending across and closing the exposure aperture 17 while a stop 18 is engaged by the shutter 14 for determining the closed position thereof.

At the region of its upper end the shutter-tripping lever 10 is formed with an inclined camming surface $10c$, this surface $10c$ being inclined from its right edge, as viewed in FIG. 1, forwardly toward the viewer of FIG. 1 and also to the left so as to terminate at the left edge of the surface $10c$, as viewed in FIG. 1, this left edge of the surface $10c$ thus being located nearer to the viewer of FIG. 1 than the right edge of the inclined camming surface $10c$. This inclined camming surface $10c$ coacts with a projecting portion $11a$ projecting laterally from one end of an elongated film-engaging means 11 which is shown most clearly in FIG. 5. The surface $10b$ of the lever 10 which is visible in FIG. 1 surrounds the inclined camming surface $10c$ extending beneath and to the right and left of the camming surface $10c$, and this flat surface $10b$ acts as a blocking surface for engaging the projection $11a$ of the film-engaging means 11 to block the latter against movement by the spring 12 into engagement with the film 13, as is apparent particularly from FIG. 5. Thus, the surface $10b$ of the lever 10 blocks the film-engaging means 11 from being displaced by the spring means 12 into engagement with the film 13 in the position of the parts shown in FIGS. 1 and 4.

A manually operable means 4 takes the form of a plate which is supported for vertical movement. A spring 6 urges the manually operable means 4 upwardly to the rest position thereof shown in FIG. 1. The plate 4 is formed with a pair of elongated slots $4b$ through which stationary pins 5 extend so that these pins serve to guide the manually operable means 4 for vertical movement. In its rest position the upper end $4a$ of the manually operable means 4 extends upwardly through the opening $1a$ in the wall 1, as illustrated in FIG. 1. Thus the top end $4a$ of the manually operable means 4 is freely accessible to the operator to provide for actuation of the structure.

A stationary stop 3 is provided for the shutter-tripping means 10 in order to determine the cocked position of the latter. For this purpose the stationary stop 3, which is carried in any suitable way in the interior of the camera, has a stop surface $3a$ engaged by an edge $10d$ of the lever 10 when the latter is in its cocked position illustrated in FIG. 2.

It will be noted that the end of $14b$ of the shutter 14 has a drop-shaped configuration so as to reliably cover and close the exposure aperture 17 when the shutter is in its closed position.

The film-engaging means 11 has an elongated feeler or finger $11b$ which is adapted to extend through a film perforation $13a$, one of these perforations being provided for each film frame. The film-engaging means 11 has the angularly extending vertical portion $11c$ fixed to the part of the means 11 which has the feeler finger $11b$, and it is this part $11c$ which fixedly carries the horizontally extending projection $11a$ with which the shutter-tripping means 10 coacts. More particularly it is the inclined camming surface $10c$ of the lever 10 which coacts with the projection $11a$. Thus, *it will be seen that the film-engaging means 11 is composed in its entirety of a single body all parts of which are fixedly connected to each other.*

FIGS. 1-4 respectively illustrate the structure of the invention in four different phases of operation described in detail below.

FIG. 1 illustrates the first phase of the operation after an exposure has been made and before the film-transporting structure has been actuated. The tripping lever 10 is in its rest position, the manually operable means 4 is also in its upper rest position, and the film-transporting structure is free to be actuated for transporting the next unexposed film frame into the exposure position.

In this position of the parts the tripping lever 10 is situated with its edge $10a$ against the next camming pin $2b$ which is to bring about the next cocking of the shutter-tripping means 10. The surface $10b$ engages the projection $11a$ so that the feeler finger $11b$ is retracted out of the plane of the film 13 and does not extend into any film perforation $13a$.

Figure 2:
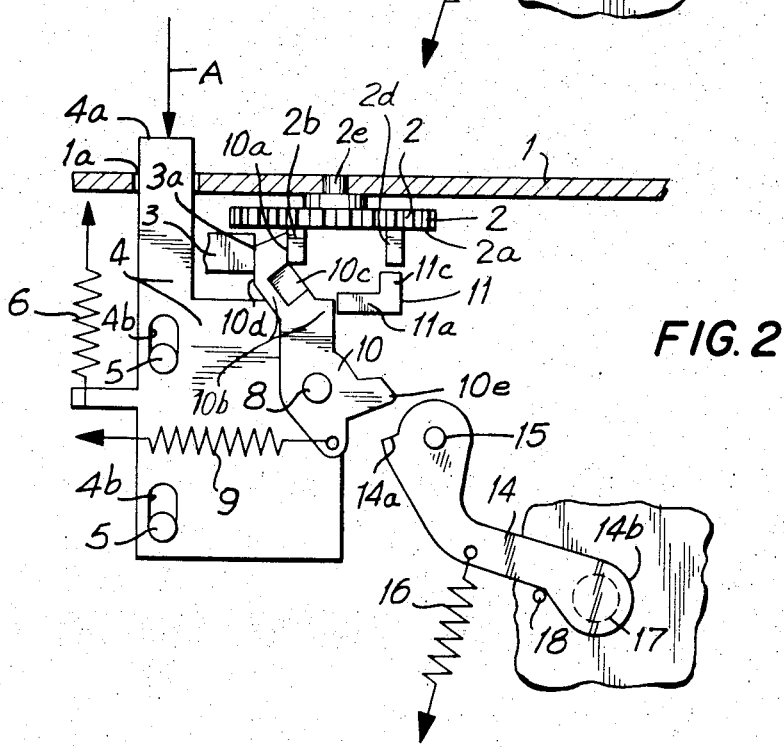
FIG. 2 shows the position which the parts of FIG. 1 take when the shutter-tripping means has been cocked.

Assuming now that the film-transporting structure is actuated, then the rotary member 2 will turn so that its pin 2b will displace the edge 10a to the left, as viewed in FIG. 1, thus swinging the lever 10 in opposition to the spring 9 up to the position shown in FIG. 2 where the shutter-tripping means 10 is in its cocked position with its edge 10d engaging the surface 3a of the stop 3. The lever 10 swings at this time about the pivot 8 while the manually operable means 4 which carries the pivot 8 remains stationary. Just before the tripping lever 10 reaches the end of its movement to its cocked position shown in FIG. 2, the surface 10b will move beyond the projection 11a, so that the spring 12 can displace the film-engaging means 11 into its holding position where the finger 11b extends through a film perforation 13a so as to hold the film in position for the next exposure. Actually the free end of the finger 11b may engage the surface of the film 13 which is visible in FIG. 5 and as the film transportation continues the next perforation 13a will reach the feeler finger 11b which will immediately enter into the perforation 13a so as to locate the film-engaging means 11 in its film-holding position. Thus, when the finger 11b enters into the opening 13a the film is held against further movement and through a known and therefore unillustrated structure the film transporting transmission is blocked against further movement and at the same time the manually operable means 4 is released for movement. Prior to transportation of the next film frame into a position for exposure the manually operable means 4 is blocked in a known way against being depressed by the operator.

FIG. 2 illustrates a second phase after the film transportation has ended. The film transporting transmission is blocked against further movement, the manually operable means 4a is released for actuation by the operator, the feeler finger 11b of the film-engaging means 11 extends into the film perforation 13a, and the camera is completely ready for the next exposure.

The shutter-tripping means 10 is now in its cocked position and engages with its edge 10d the stationary stop surface 3a of the stop 3, and it is to be noted that it is the pin or cam 2b which holds the lever 10 in the position shown in FIG. 2 in opposition to the spring 9.

Figure 3:
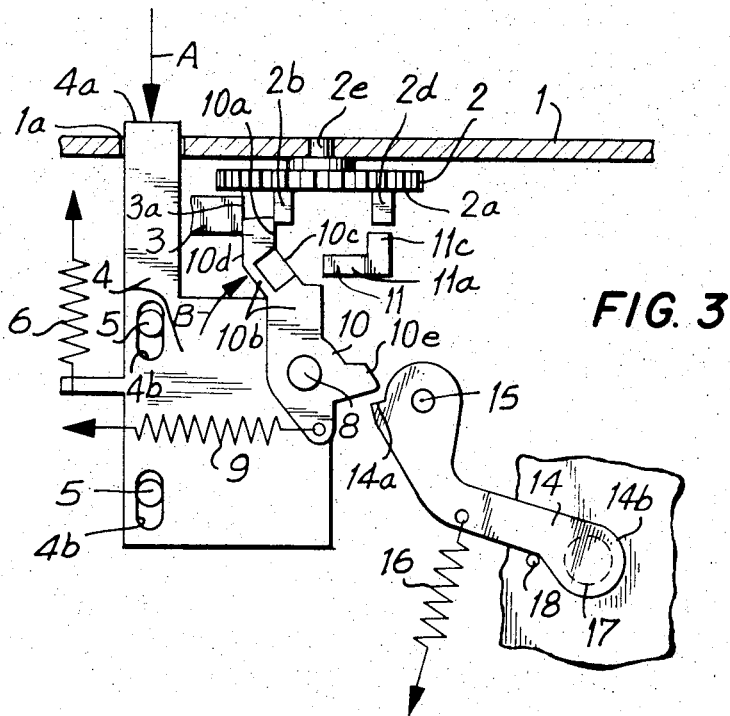
FIG. 3 shows the position which the parts take just before the instant when the shutter is tripped to make an exposure.

The third phase of the operation is illustrated in FIG. 3. The film transporting structure is still blocked and the manually operable means 4 has been depressed almost to the end of its downward movement so that the shutter is about to be tripped in order to make an exposure. The shutter-tripping means 10 is still in its cocked position and the feeler finger 11b of the film-engaging means 11 is still in the film perforation 13a. The shutter-tripping means 10 moves downwardly together with the manually operable means 4 in the direction of the arrow A of FIG. 3, but during this downward movement the pin 2b maintains the lever 10 in its cocked position. In accordance with the length of each of the pins or cams 2b, 2c, 2d, the stroke required for the manually operable means before the lever 10 is released to trip the shutter will be determined. Thus these pins or cams 2b, 2c, 2d may be given a length within certain variable limits which will determine the instant when the shutter-tripping means 10 is released for movement by the spring means 9 from its cocked to its rest position. As soon as the edge 10a moves downwardly beyond the pin 2b with the position of the part shown in FIG. 3, the spring 9 will drive the lever 10 in a clockwise direction about the pin 8, as indicated by the arrow B of FIG. 3 so that the shutter-tripping means 10 will return into its rest position, and during this swinging movement of the lever 10 its projection 10e strikes against the edge 14a of the shutter blade 14 so as to swing the latter in a counterclockwise direction in opposition to the spring 16 about the pin 15, as viewed in FIG. 3, thus uncovering the aperture 17 so as to make the exposure.

Simultaneously, the incline camming surface 10c will engage the projection 11a of the film-engaging means 11, moving in front of the projection 11a, as viewed in FIG. 3, so as to retract the film-engaging means 11 in opposition to the spring 12 to the retracted position where the feeler 11b is displaced beyond the opening 13a and the plane of the film 13. At this time the film-engaging means is moved in the direction of the arrow D shown in FIG. 5. The relationship between the pair of spring means 9 and 12 is such that the force of the relatively weak spring means 12 is easily overcome by the force of the spring 9 which in addition to its own force plus the kinetic energy of the swinging lever 10 will bring about an effective movement of the film-engaging means 11 from its holding to its retracted position in opposition to the spring 12 even if the spring 9 is not a particularly strong spring.

Figure 4:
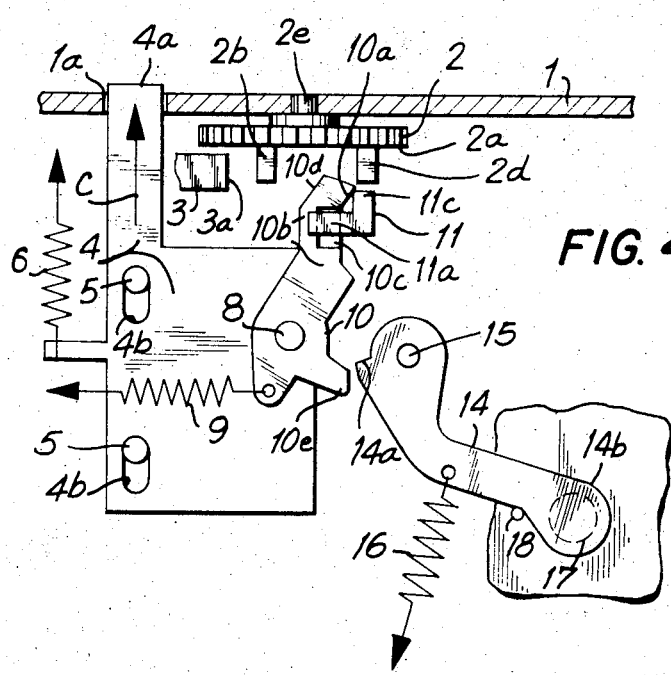
FIG. 4 shows the position which the parts of FIGS. 1–3 take immediately subsequent to an exposure while the manually operable means is still depressed.
Figure 5:
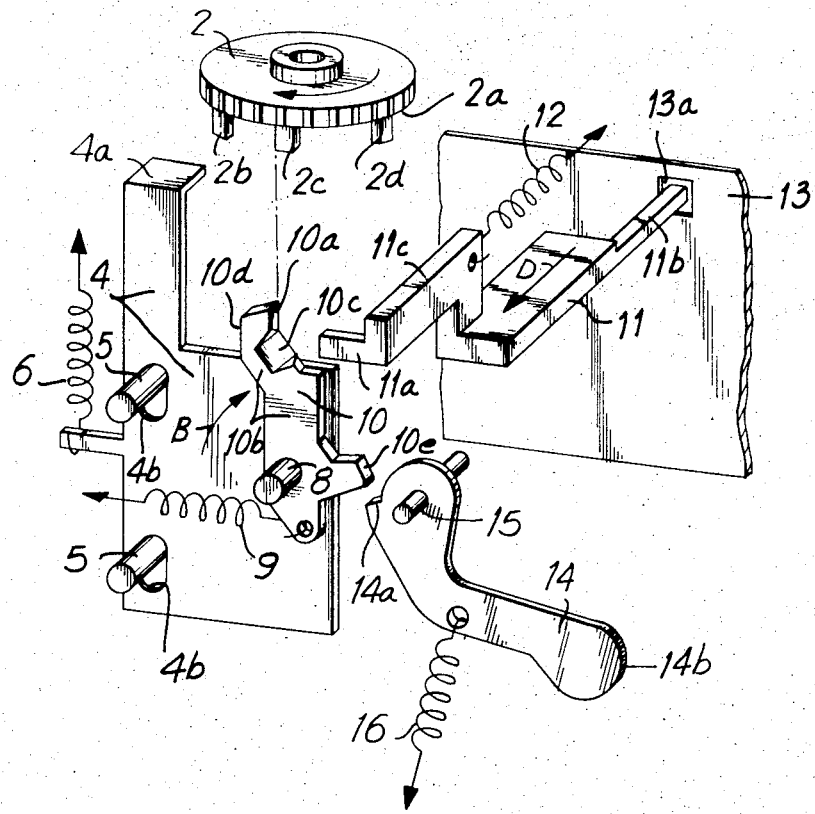
FIG. 5 is a schematic perspective illustration showing in a partly exploded view the most important components of the structure of the invention.

The fourth phase of the operation is illustrated in FIG. 4. The film transporting transmission is still blocked and the shutter-tripping lever 10 again is in its rest position. The manually operable means 4 is still held at its bottom end position in opposition to the spring 6 since the finger of the operator is still pressing on the upper end 4a of the manually operable means 4. The blocking surface 10b of the shutter-tripping lever 10 now engages the projection 11a to hold the film-engaging means in its retracted position, and it will be noted that the inclined camming surface 10c has moved all the way behind the projection 11a.

The operator will now release the manually operable means 4 so that the spring 6 will return it upwardly in the direction of the arrow C, and at this time the flat vertical surface 10b of the lever 10 will slide with respect to the projection 11a while retaining the film-engaging means 11 in its retracted position. Thus the parts will now return to the position shown in FIG. 1. Simultaneously with the upward movement of the plate which forms the manually operable means 4, the lever 10 moves upwardly so that its edge 10a will now become situated in the path of movement of the next-following camming pin 2d of the rotary member 2, so that the above-described operations will again take place after blocking of the manually operable means against further depression and after release of the film-transporting structure. During the return of the lever 10 upwardly with the manually operable means the projection 10e can move freely past the projection 14a of the shutter 14 without engaging the shutter.

It is possible to provide a different construction according to which the return upward movement of the manually operable means 4 and the lever 10 therewith can be used in order to retract the film-engaging means 11 away from the film plane by providing the surface 10b with a camming surface portion which extends vertically and which is suitably inclined so as to operate in response to vertical movement of the lever 10 for retracting the feeler finger 11b out of the film perforation 13 during upward movement of the lever 10 together with the manually operable means 4.

Also, it is possible by suitable arrangement of the camming surface 10c to divide the retraction of the film-engaging means 11 from its holding to its retracting position into a pair of strokes. For example the first partial movement from the holding to the retracting position can take place by the return of the lever 10 to its rest position by the spring 9, a radially acting camming surface of the lever 10 being relied upon at this time to bring about partial movement of the film-engaging means 11 from its holding to its retracting position. The second and final stroke or part of this movement can be brought about by the upward movement of the lever 10 with the manually operable means 4 when the operator releases the manually operable means so that now a vertically acting camming surface portion will complete the retraction of the film-engaging means 11.

It is to be noted that the rotary member 2 can either form part of the film-transporting structure as pointed out above or it may form part of a flash-cube carrying structure which will provide the required operation in connection with displacement of flash-cubes in a well known manner. Such flash-cube structure can be situated in the film-transporting transmission and may form part of this transmission, and the flash-cube actuating structure can of course be provided with camming pins 2b, 2c, 2d as described above.

It will be noted that with the above-described structure of the invention it is possible to maintain the spring forces at a minimum by relying upon the kinetic energy of the swinging lever 10 which is used to retract the film-engaging means 11 out of the film perforation.

Moreover, the stroke of the manually operable means is reduced to a minimum because the pins 2b, 2c, 2d in addition to holding the shutter-tripping means in its cocked position also serve by their length to determine the instant when the lever 10 is released to trip the shutter as the manually operable means 4 reaches the end of its downward movement.

Furthermore, with the structure of the invention it is possible to construct the lever 10 as a one-armed lever so that a considerable amount of space is saved in the interior of the camera.

What is claimed is:

1. In a camera, film-engaging means for holding a film strip in a position for exposure with said film-engaging means extending into a perforation of the film strip, said film-engaging means being movable between a holding position extending into a film perforation and a retracted position displaced from a film strip, shutter-tripping means for tripping a shutter of a camera to make an exposure, said shutter-tripping means being movable between a rest position and a cocked position for movement from said cocked position to said rest position to trip the camera shutter so as to make an exposure, said shutter-tripping means when moving from said cocked to said rest position thereof coacting with said film-engaging means for displacing the latter from said holding to said retracted position thereof, manually operable means coacting with said shutter-tripping means for releasing the latter for movement from said cocked to said rest position thereof, and cocking means responding to transportation of film in the camera and coacting with said shutter-tripping means for displacing the latter from said rest to said cocked position when film is transported in the camera, said shutter-cocking means when moving said shutter-tripping means from said rest to said cocked position thereof releasing said film-engaging means for movement from said retracted to said holding position thereof, a pair of spring means respectively coacting with said shutter-tripping means and with said film-engaging means for respectively urging said shutter-tripping means to said rest position thereof and said film-engaging means to said holding position thereof, said pair of spring means having with respect to each other a relationship which will provide for retraction of said film-engaging means from said holding to said retracted position by said shutter-tripping means only in response to movement of the latter from said cocked to said rest position by the spring means operatively connected to said shutter-tripping means, said film-engaging means consisting of a single body, and said shutter-tripping means and said film-engaging means having a pair of surfaces, respectively, engaging each other when said shutter-tripping means is in said rest position thereof maintaining said film-engaging means in said retracted position, one of said surfaces being an inclined camming surface coacting with the other of said surfaces for camming said film-engaging means from said holding to said retracting position in response to movement of said shutter-tripping means from said cocked to said rest position thereof.

2. The combination of claim 1 and wherein said inclined surface forms part of said shutter-tripping means, said manually operable means coacting with said shutter-tripping means for displacing the latter linearly, and said shutter-tripping means coacting during part of its linear movement with said film-engaging means for holding the latter in its retracted position.

3. The combination of claim 1 and wherein said shutter-tripping means is in the form of a swingable lever having said inclined camming surface, said film-engaging means having a projection engaged by said camming surface during swinging of said lever to said rest position to be retracted by the swinging lever to said retracted position.

4. The combination of claim 3 and wherein said lever has a flat holding surface surrounding said inclined surface and engaging said projection of said film-engaging means for holding the latter in said retracted position thereof.

5. In a camera, film-engaging means for holding a film strip in a position for exposure with said film-engaging means extending into a perforation of the film strip, said film-engaging means being movable between a holding position extending into a film perforation and a retracted position displaced from a film strip, shutter-tripping means for tripping a shutter of a camera to make an exposure, said shutter-tripping means being movable between a rest position and a cocked position for movement from said cocked position to said rest position to trip the camera shutter so as to make an exposure, said shutter-tripping means when moving from said cocked to said rest position thereof coacting with said film-engaging means for displacing the latter from said holding to said retracted position thereof, manually operable means coacting with said shutter-tripping means for releasing the latter for movement from said cocked to said rest position thereof, and cocking means responding to transportation of film in the camera and coacting with said shutter-tripping means for displacing the latter from said rest to said cocked position when film is transported in the camera, said shutter-cocking means when moving said shutter-tripping means from said rest to said cocked position thereof releasing said film-engaging means for movement from said retracted to said holding position thereof, said cocking means including a rotary member having a plurality of elongated pins which sequentially engage said shutter-tripping means to displace the latter from said rest to said cocked position thereof during sequential exposures, respectively, each of said pins having a length great enough to hold said shutter-tripping means in said cocked position thereof until said shutter-tripping means is released by said manually operable means for tripping the camera shutter, said manually operable means when operated to release said shutter-tripping means for movement from said cocked to said rest position thereof displacing said shutter-tripping means longitudinally along one of said pins toward a free end thereof so that when said shutter-tripping means reaches said free end of said pin it will be released for tripping the camera shutter, and each of said pins having a length which determines the instant when said shutter-tripping means is released for movement from said cocked position to trip the shutter with each pin forming the only structure which determines when shutter-tripping takes place in response to actuation of said manually operable means.

* * * * *